(12) United States Patent
Lai et al.

(10) Patent No.: US 6,672,737 B2
(45) Date of Patent: Jan. 6, 2004

(54) UNIFORM RADIATION INTENSITY GENERATION BOX USING A SYMMETRICAL LIGHTING SOURCE

(75) Inventors: Peng Cheng Lai, Banchiau (TW); Douglas W. Wang, Hsinchu (TW); Wei Shang Cheng, Taichung (TW); Yu Chang Chang, Hsinchu (TW); Kueng Yan Wu, Fengyuan (TW)

(73) Assignee: Waytech Development, Inc., Hsinchu (TW)

( * ) Notice: Subject to any disclaimer, the term of this patent is extended or adjusted under 35 U.S.C. 154(b) by 0 days.

(21) Appl. No.: 10/147,061

(22) Filed: May 17, 2002

(65) Prior Publication Data

US 2003/0193800 A1 Oct. 16, 2003

(30) Foreign Application Priority Data

Apr. 12, 2002 (TW) ........................... 91204848 U

(51) Int. Cl.⁷ .............. F21V 1/00; F21V 11/00
(52) U.S. Cl. ............ 362/240; 362/11; 362/16; 362/235; 362/33; 362/311; 362/225
(58) Field of Search .............. 362/3, 11, 16, 362/240, 227, 235, 236, 237, 246, 245, 33, 355, 311, 225

(56) References Cited

U.S. PATENT DOCUMENTS 5,774,214 A  *  6/1998  Prettyjohns ............ 356/344

* cited by examiner

*Primary Examiner*—Stephen Husar
*Assistant Examiner*—Sharon Payne
(74) *Attorney, Agent, or Firm*—Rosenberg, Klein & Lee

(57) ABSTRACT

A uniform radiation intensity generation box using a symmetrical lighting source is constructed to include a housing, the housing having a top opening for the mounting of a camera for taking photos of a real object and a door at one side, a plurality of lamp tubes vertically symmetrically provided inside the housing, and a plurality of diffusion plates mounted inside the housing and covered over the lamp tubes, each diffusion plate having a plurality of diffusing grains uniformly arranged in one face thereof and adapted for diffusing light from the lamp tubes in all directions inside the housing.

6 Claims, 8 Drawing Sheets

UNIFORM RADIATION INTENSITY GENERATION BOX USING A SYMMETRICAL LIGHTING SOURCE

BACKGROUND OF THE INVENTION

1. Field of the Invention

The present invention relates a lamp box and, more particularly, to a uniform radiation intensity generation box using a symmetrical lighting source.

2. Description of the Related Art

Following fast development of network communication technology, electronic commerce and Internet shops are popular nowadays. Through the computer and information networks, consumers can go to different Internet shops to order or look at photos of a variety of products. In order to show beautiful photos of products, sufficient and uniform light source must be provided during photographing. Various lamp boxes have been disclosed for this purpose. FIG. 1 shows a gain multilight lamp box according to the prior art. According to this design, the lamp box comprises a box body 12 having a front opening 14, a plurality of lamp tubes 16 arranged in parallel in the top side of the box body 12, and a planar diffusion plate 18 mounted in the bottom side of the box body 12. This design of lamp box is practical for taking photos of planar object but not suitable for three-dimensional real objects because the lamp tubes 16 provides uniform radiation intensity simply on a plane. Further, the radiation intensity in the area beneath the lamp tubes 16 is relatively higher than the other areas inside the box body, resulting in a distortion of light. FIG. 2 shows another design of lamp box according to the prior art. According to this design, the lamp box 10 comprises a box body 12, the box body 12 having an opening 14 in one of the four vertical peripheral sides thereof through which the real object, for example, a jewel is put inside the box body 12, three lamp tubes 16 respectively mounted in the other three vertical peripheral sides inside the box body 12, a camera 20 mounted in a top opening in the box body 12 and adapted for taking photos of the jewel. Because the lighting source is not symmetrical, only sufficient illumination but not uniform radiation intensity is provided inside the box body.

Furthermore, in the aforesaid two prior art designs, the opening 14 cannot isolate external light, i.e., the internal light source tends to be interfered by an external light source, resulting in a color distortion.

SUMMARY OF THE INVENTION

The present invention has been accomplished under the circumstances in view. It is one object of the present invention to provide a uniform radiation intensity generation box using a symmetrical lighting source, which provides uniform radiation intensity to show the color of the real object accurately in all directions for photographing. It is another object of the present invention to provide a uniform radiation intensity generation box using a symmetrical lighting source, which eliminates interference of external light source, facilitating the performance of taking photos of the real object. To achieve these and other objects of the present invention, the uniform radiation intensity generation box using a symmetrical lighting source comprises a housing, the housing having a top opening for the mounting of a camera for taking photos of a real object and a door at one side, a plurality of lamp tubes vertically symmetrically provided inside the housing, and a plurality of diffusion plates mounted inside the housing and covered over the lamp tubes, each diffusion plate having a plurality of diffusing grains uniformly arranged in one face thereof and adapted for diffusing light from the lamp tubes in all directions inside the housing. The housing can be made having a rectangular or cylindrical shape. The diffusion plates can be shaped like a planar plate or half-round tube. Alternatively, each diffusion plate can be made comprising two planar plate portions and an arched plate portion connected between the planar plate portions.

DETAILED DESCRIPTION OF THE PREFERRED EMBODIMENT

Figure 1:
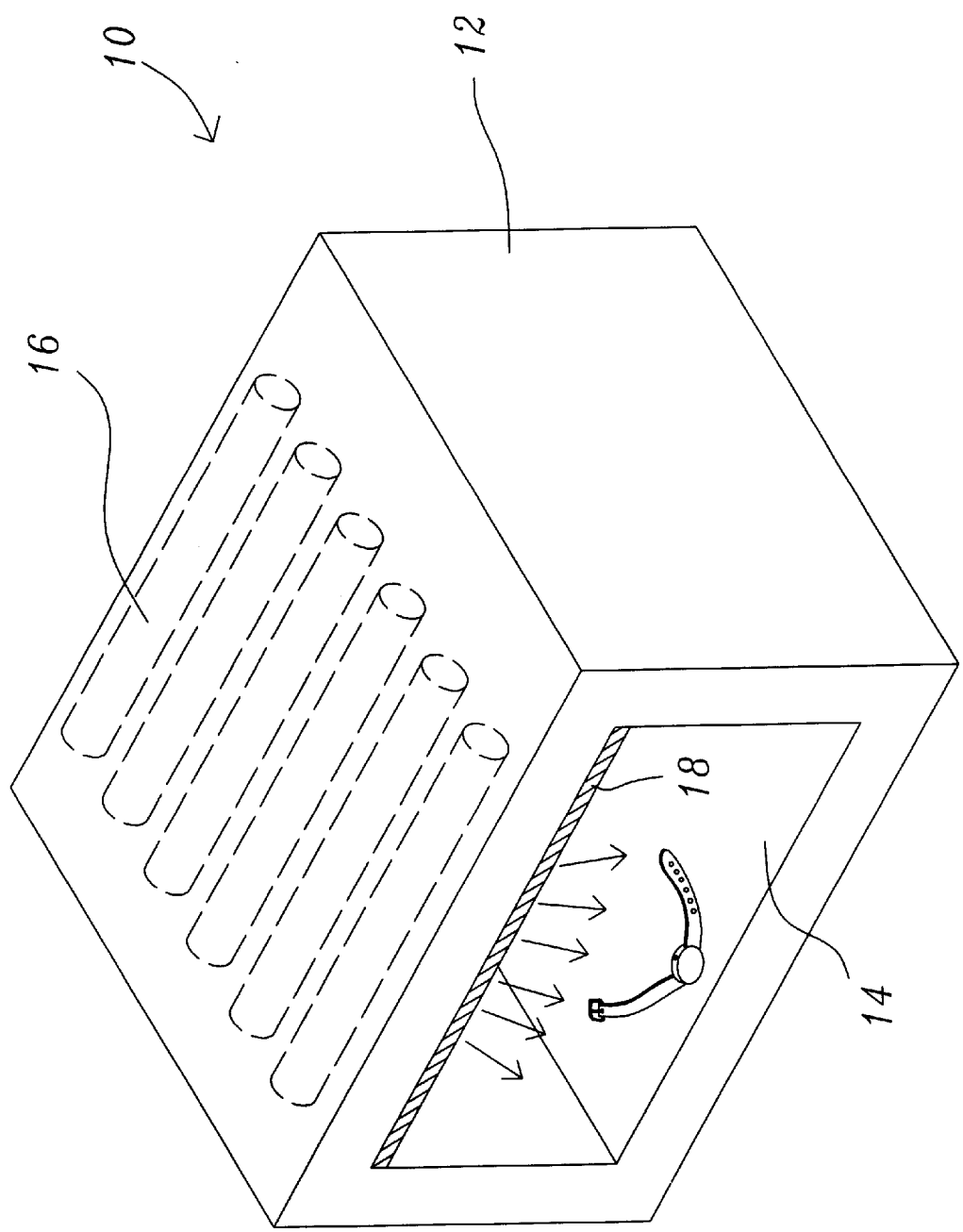
FIG. 1 is a perspective view of a lamp box according to the prior art.
Figure 2:
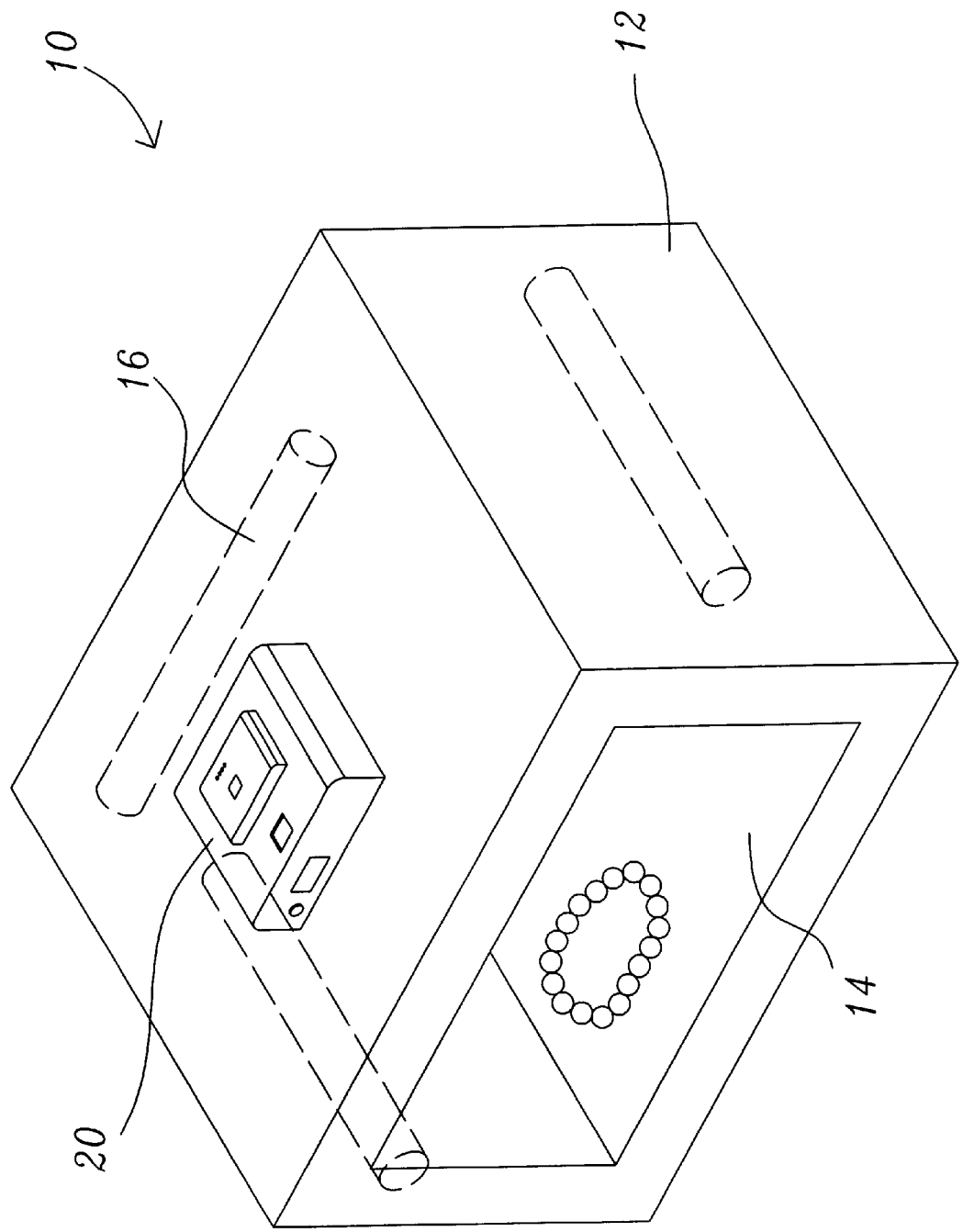
FIG. 2 is a perspective view of another structure of lamp
Figure 3:
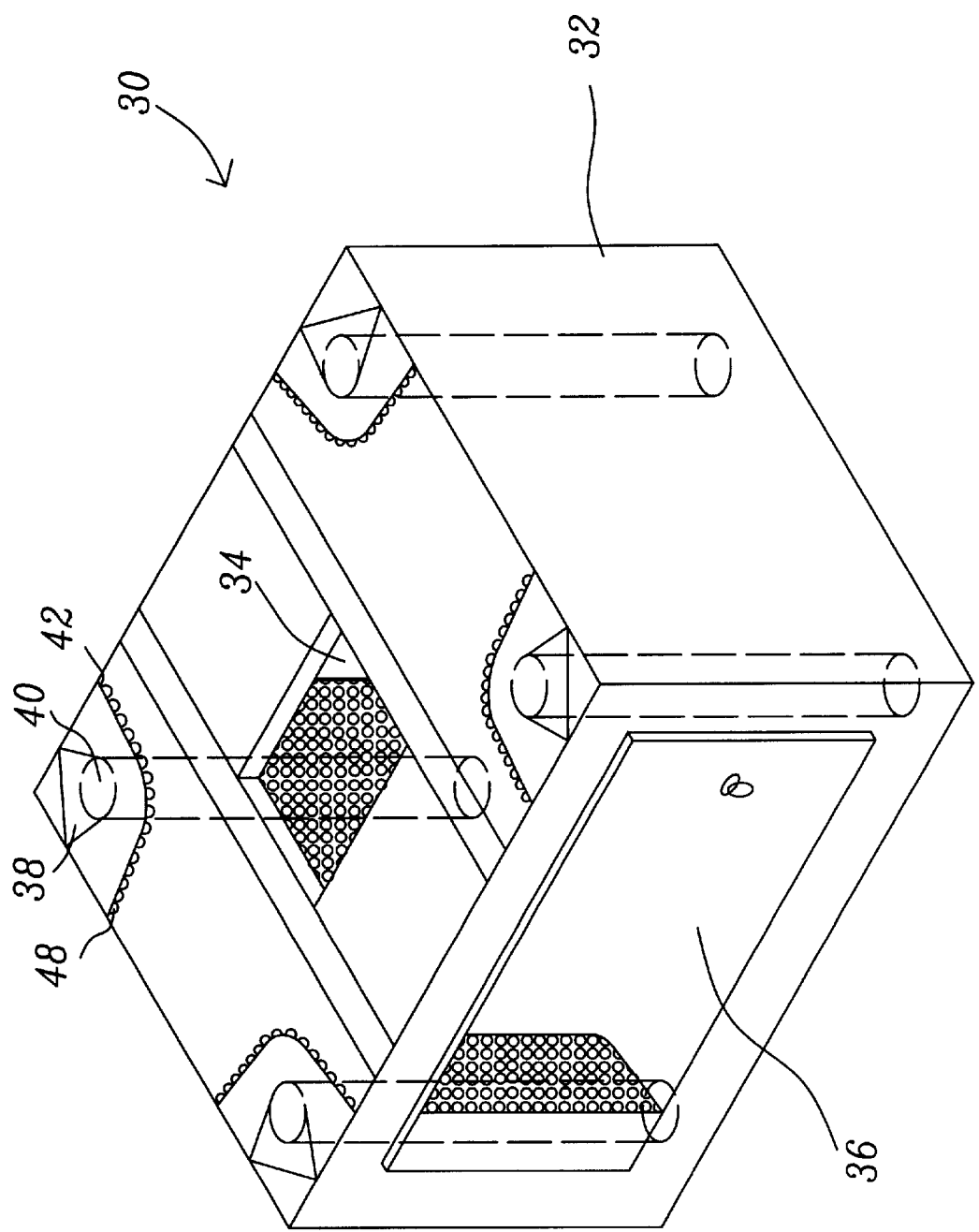
FIG. 3 is a perspective view of a uniform radiation intensity generation box using a symmetrical lighting source according to the present invention.
Figure 4:
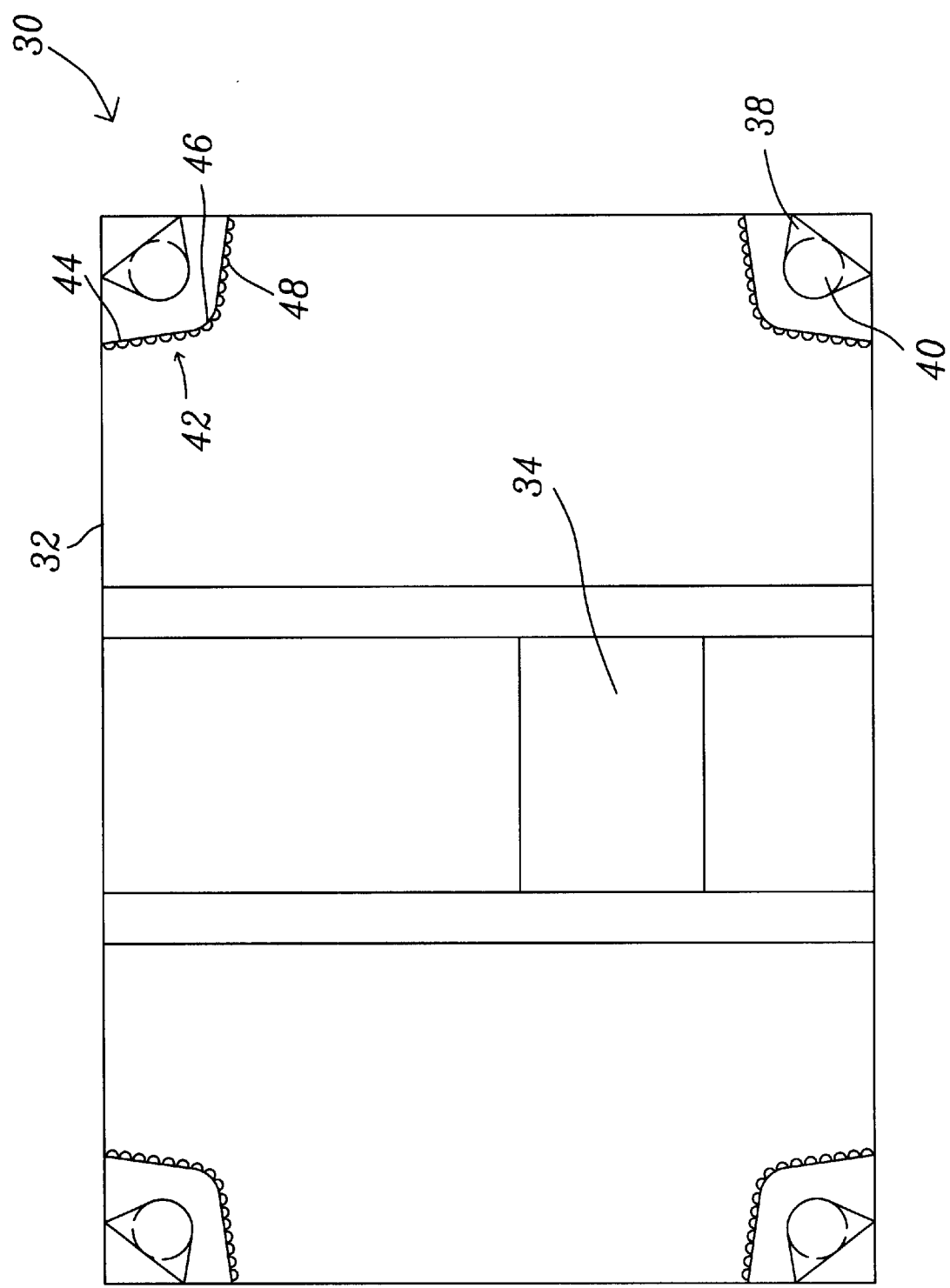
FIG. 4 is a top view of the uniform radiation intensity generation box using a symmetrical lighting source according to the present invention.

Referring to FIGS. 3 and 4, a uniform radiation intensity generation box 30 is shown comprising a rectangular housing 32. The rectangular housing 32 has a top opening 34 for the mounting of a camera for enabling the lens assembly of the camera to be inserted into the inside of the rectangular housing 32 to pick up the image of the real object, and a door 36 provided at one peripheral side thereof for enabling the user to put the real object to be photographed inside the rectangular housing 32 after opening of the door 36. Four lamp brackets 38 are respectively fixedly provided in the four corners inside the rectangular housing 32, each holding a respective lamp tube 40 in vertical. Four diffusion plates 42 are provided inside the rectangular housing 32 and respectively covered over the lamp tubes 40 in the lamp brackets 38. Each diffusion plate 42 is comprised of two planar plate portions 44 and an arched plate portion 46 connected between the planar plate portions 44. Grains 48 are uniformly formed in the outer surface of each diffusion plate 42.

The inside wall of the rectangular housing 32 is frosted or coated with a layer of paint of gray color for diffusing light uniformly. The two planar plate portions 44 of each diffusion plate 42 define an obtuse angle, so that uniform radiation intensity is produced in the rectangular housing 32 after diffusion of light from the lamp tubes 40 by the grains 48 of the diffusion plates 42.

Figure 5:
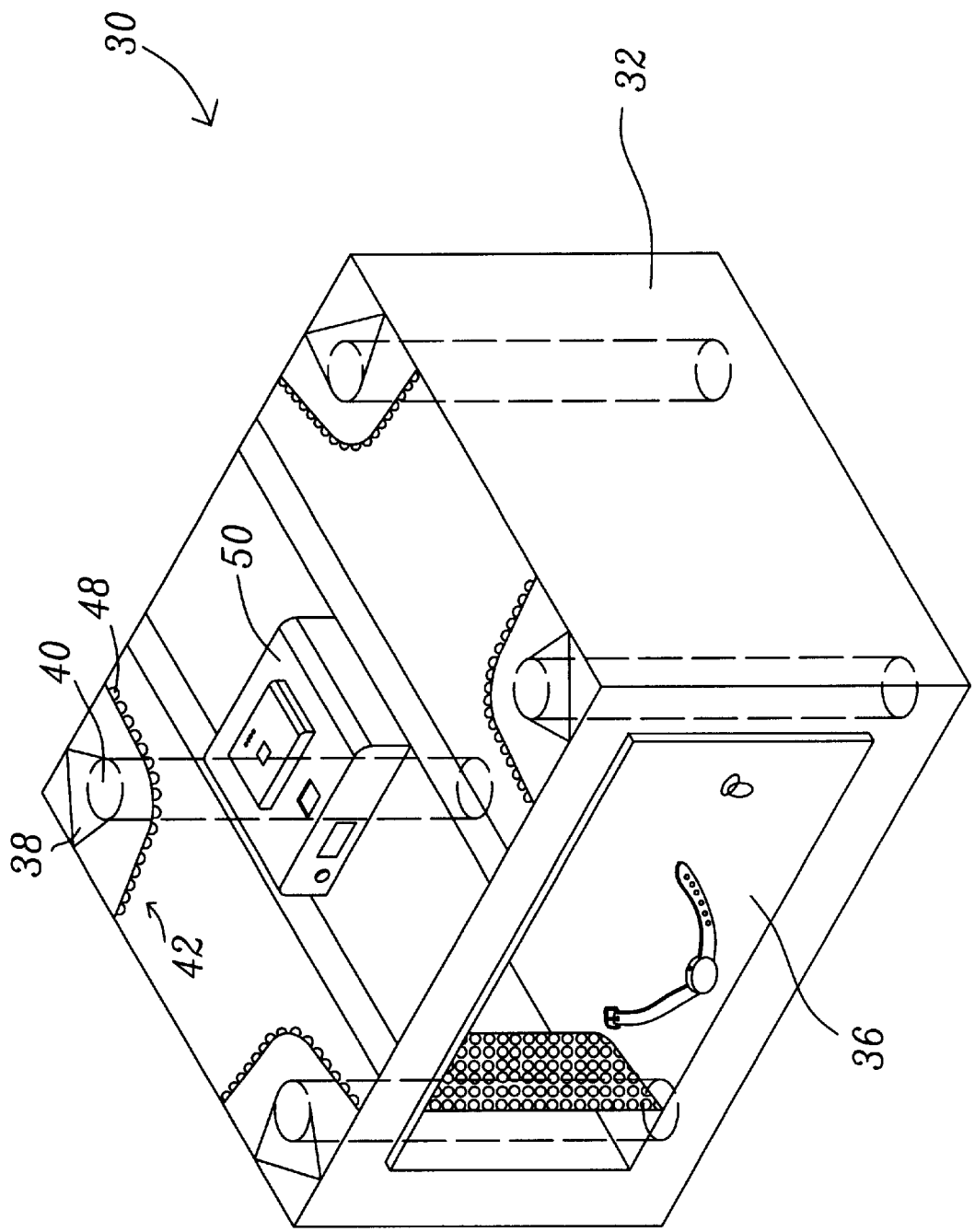
FIG. 5 shows an application example of the present invention.

Referring to FIG. 5, after positioning of the real object to be photographed in the rectangular housing 32, the door 36 is closed, and the camera 50 is installed, keeping the holding space of the rectangular housing 32 in an enclosed status free from interference of external light source. Because the light of the lamp tubes 40 are uniformly diffused in all directions inside the rectangular housing 32 the three-dimensional color features of the real object are shown and picked up by the camera 50.

Figure 6:
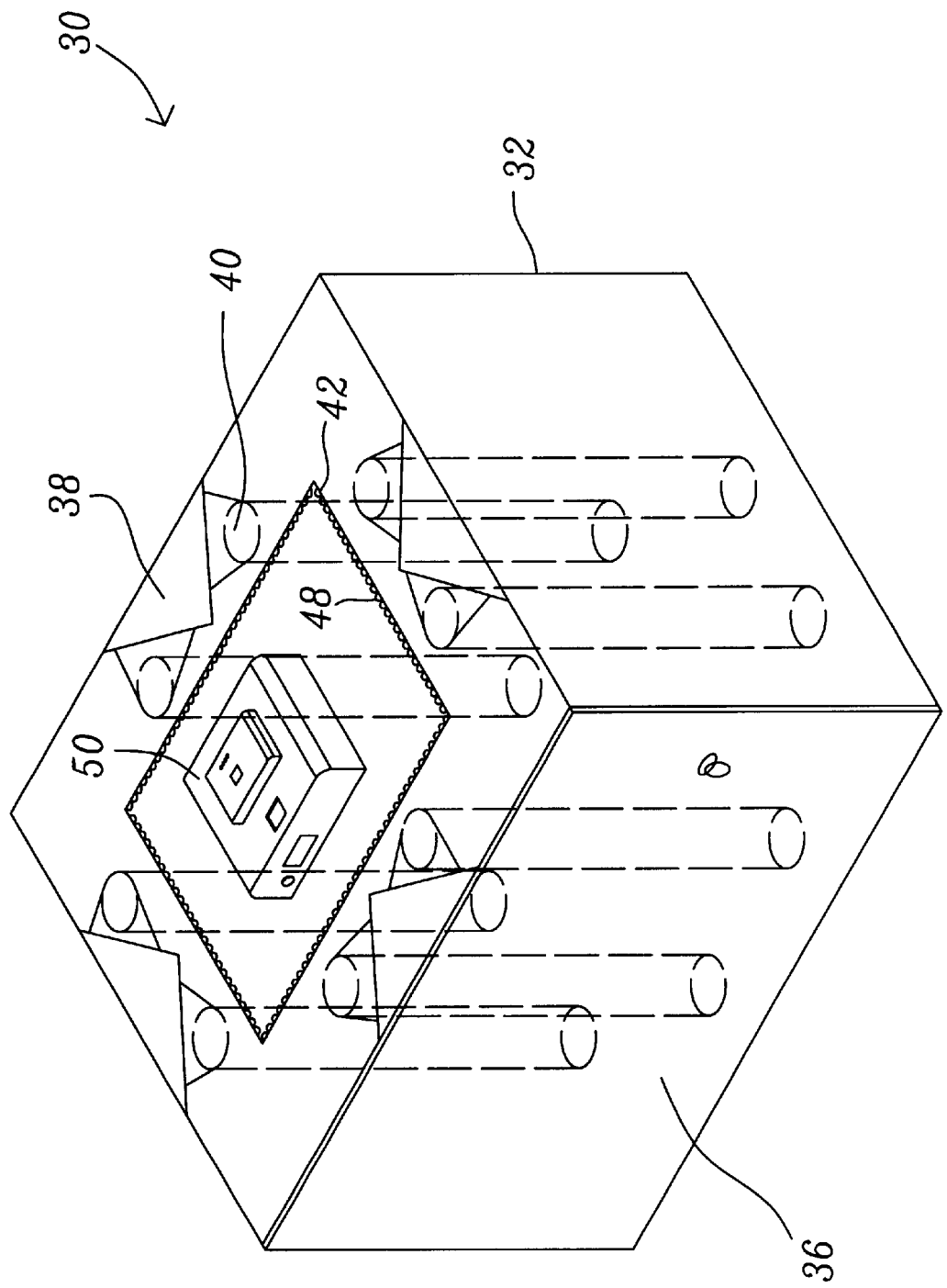
FIG. 6 is a perspective view of an alternate form of the uniformly radiation intensity generation box by symmetrical lighting source according to the present invention.
Figure 7:
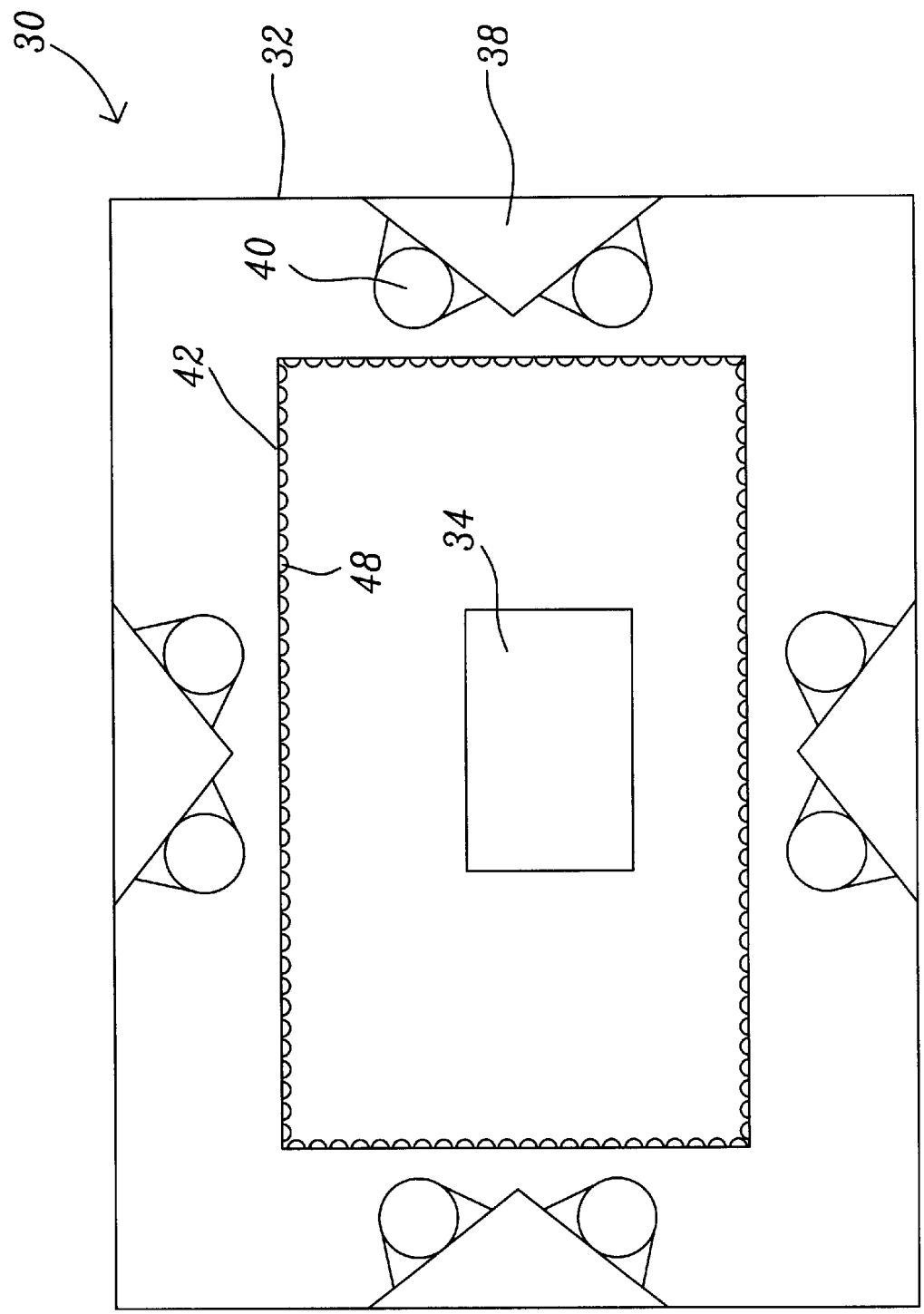
FIG. 7 is a top view of the uniformly radiation intensity generation box by symmetrical lighting source shown in FIG. 6.

FIGS. 6 and 7 show an alternate form of the present invention. According to this alternate form, four triangular lamp brackets 38 are respectively provided on the middle of each of the four peripheral sidewalls inside the rectangular housing 32. Each triangular lamp bracket 38 holds two lamp tubes 40 symmetrically at two sides in vertical. Four diffusion plates 42 are respectively mounted inside the rectangular housing 42 in front of each of the triangular lamp brackets 38. The four diffusion plates 42 are planar diffusion plates connected to one another and defining a rectangular space. During photographing, the real object is put in the rectangular space surrounded with the diffusion plates 42. The diffusion plates 54 have grains 48 uniformly arranged in the respective inner surfaces inside the rectangular space surrounded by the diffusion plates 54. The grains 48 diffuse light from the lamp tubes 40 into the rectangular space surrounded by the diffusion plates 42 uniformly in all directions.

Figure 8:
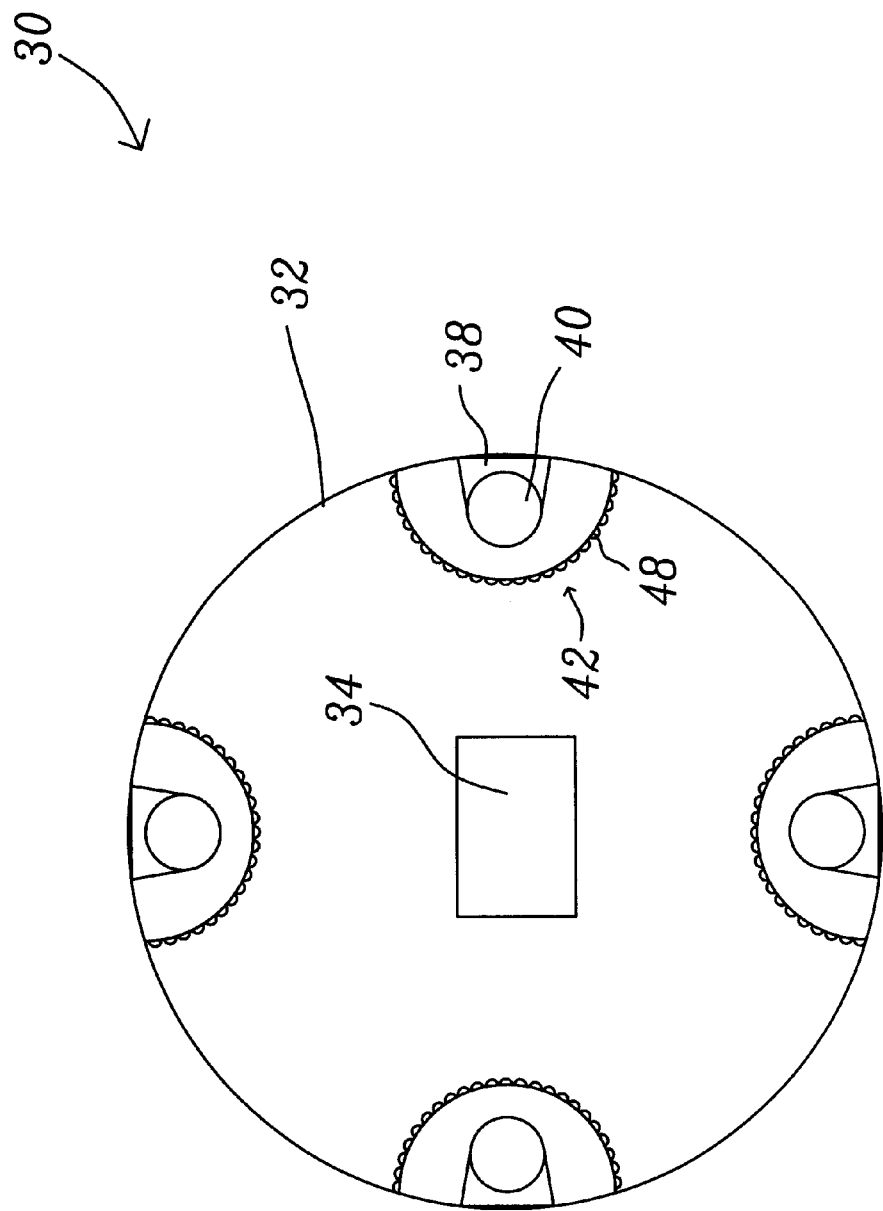
FIG. 8 is a top view of another alternate form of the uniformly radiation intensity generation box by symmetrical lighting source according to the present invention.

FIG. 8 shows another alternate form of the uniform radiation intensity generation box using a symmetrical lighting source according to the present invention. According to this embodiment, the housing 32 is a cylindrical case. Four lamp brackets 38 are symmetrically mounted inside the housing 32 and equally spaced from one another. Each lamp bracket 38 holds a lamp tube 40 in vertical. Four diffusion plates 42 are mounted inside the housing 32 and respectively covered over the lamp tubes 40 in the lamp brackets 38. The diffusion plates 42 are shaped like a half-round tube having a semicircular cross-section. Each diffusion plate 42 has grains 48 uniformly arranged in the respective outer surface for diffusing light from the respective lamp tube 40 uniformly in all directions.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A uniform radiation intensity generation box using a symmetrical lighting source comprising:

a housing, said housing having a top opening in a top side thereof for the mounting of a camera for taking photos of a real object put inside said housing, and a door at one side;

a plurality of lamp tubes vertically symmetrically provided inside said housing; and a plurality of diffusion plates mounted inside said housing and covering said lamp tubes, said diffusion plates each having a plurality of diffusing grains uniformly arranged in one face thereof and adapted for diffusing light from said lamp tubes in all directions inside said housing.

2. A uniform radiation intensity generation box using a symmetrical lighting source as claimed in claim 1, wherein said diffusion plates are shaped like a half-round tube.

3. A uniform radiation intensity generation box using a symmetrical lighting source as claimed in claim 1, wherein said diffusion plates are planar diffusion plates.

4. A uniform radiation intensity generation box using a symmetrical lighting source as claimed in claim 1, wherein said diffusion plates each comprise two planar plate portions and an arched plate portion connected between said planar plate portions.

5. A uniform radiation intensity generation box using a symmetrical lighting source as claimed in claim 4, wherein said planar plate portions define an obtuse angle.

6. A uniform radiation intensity generation box using a symmetrical lighting source as claimed in claim 1, wherein said housing has a frosted inside wall.

\* \* \* \* \*